United States Patent
Kwon et al.

(10) Patent No.: US 12,273,833 B2
(45) Date of Patent: Apr. 8, 2025

(54) METHOD FOR CLOCK SYNCHRONIZATION OF COMMUNICATION NETWORK, AND THE COMMUNICATION NETWORK USING THE SAME

(71) Applicant: SOLiD, INC., Seongnam-si (KR)

(72) Inventors: Donghee Kwon, Yongin-si (KR); Hoopyo Hong, Gwacheon-si (KR)

(73) Assignee: SOLiD, INC., Seongnam-si (KR)

( * ) Notice: Subject to any disclaimer, the term of this patent is extended or adjusted under 35 U.S.C. 154(b) by 285 days.

(21) Appl. No.: 17/780,806

(22) PCT Filed: Dec. 3, 2019

(86) PCT No.: PCT/KR2019/016939
§ 371 (c)(1),
(2) Date: May 27, 2022

(87) PCT Pub. No.: WO2021/107240
PCT Pub. Date: Jun. 3, 2021

(65) Prior Publication Data
US 2022/0417882 A1    Dec. 29, 2022

(30) Foreign Application Priority Data
Nov. 29, 2019  (KR) .......................... 10-2019-0157696

(51) Int. Cl.
*H04W 56/00*    (2009.01)
*H04J 3/06*     (2006.01)
(Continued)

(52) U.S. Cl.
CPC ....... *H04W 56/0015* (2013.01); *H04J 3/0679* (2013.01); *H04L 7/0008* (2013.01); *H04L 7/033* (2013.01)

(58) Field of Classification Search
CPC ....... G01S 19/13; H04J 3/0635; H04J 3/0641; H04J 3/0644; H04J 3/0679; H04L 7/0008;
(Continued)

(56) References Cited

U.S. PATENT DOCUMENTS 7,684,435 B2   3/2010  Kim et al.
9,220,076 B2  12/2015  He et al.
(Continued)

FOREIGN PATENT DOCUMENTS

EP   1 139 594 A2   10/2001
EP   3 651 387 A1    5/2020
(Continued)

OTHER PUBLICATIONS

International Search Report for PCT/KR2019/016939 dated, Aug. 24, 2020 (PCT/ISA/210).
(Continued)

*Primary Examiner* — Robert J Lopata
(74) *Attorney, Agent, or Firm* — Sughrue Mion, PLLC

(57) ABSTRACT

Provided are a clock synchronization method performed between communication nodes included in a communication network, the clock synchronization method comprises receiving a synchronization source signal through any one of remaining communication nodes except for an uppermost communication node included in the communication network, generating a reference clock for clock synchronization from the received synchronization source signal and transmitting the generated reference clock through a first path including at least a portion reverse to a second path through which a downlink signal is transmitted in the communication network.

15 Claims, 4 Drawing Sheets

(51) Int. Cl.
*H04L 7/00* (2006.01)
*H04L 7/033* (2006.01)

(58) Field of Classification Search
CPC .. H04L 7/033; H04W 56/0015; H04W 88/085
USPC ......................................................... 370/329
See application file for complete search history.

(56) References Cited

U.S. PATENT DOCUMENTS

| | | | |
|---|---|---|---|
| 11,146,347 B2 | 10/2021 | Ahn et al. | |
| 2014/0243033 A1* | 8/2014 | Wala | H04W 24/00 |
| | | | 455/517 |
| 2016/0270016 A1* | 9/2016 | Harel | H04W 24/02 |
| 2019/0116568 A1 | 4/2019 | Fertonani et al. | |
| 2019/0191318 A1* | 6/2019 | Jovanovic | H04W 48/16 |
| 2020/0059994 A1* | 2/2020 | Li | H04W 48/12 |
| 2021/0083726 A1* | 3/2021 | Wala | H01Q 1/246 |
| 2022/0352929 A1* | 11/2022 | Jang | H04B 7/2609 |

FOREIGN PATENT DOCUMENTS

| | | |
|---|---|---|
| JP | 2004-40802 A | 2/2004 |
| JP | 2013-535126 A | 9/2013 |
| KR | 10-2007-0059907 A | 6/2007 |
| KR | 10-2017-0027840 A | 3/2017 |
| WO | 2019/066276 A1 | 4/2019 |
| WO | 2019/226012 A1 | 11/2019 |

OTHER PUBLICATIONS

Written Opinion of the International Searching Authority for PCT/KR2019/016939 dated, Aug. 24, 2020 (PCT/ISA/237).
Extended European Search Report dated Nov. 29, 2023 in European Application No. 19954301.8.
Communication dated Oct. 18, 2024, issued in Korean Application No. 10-2019-0157696.
Japanese Office Action dated Feb. 4, 2025 in Application No. 2024-061184.

* cited by examiner

METHOD FOR CLOCK SYNCHRONIZATION OF COMMUNICATION NETWORK, AND THE COMMUNICATION NETWORK USING THE SAME

CROSS REFERENCE TO RELATED APPLICATIONS

This application is a National Stage of International Application No. PCT/KR2019/016939 filed on Dec. 3, 2019, claiming priority based on Korean Patent Application No. 10-2019-0157696 filed on Nov. 29, 2019.

TECHNICAL FIELD

The present invention relates to a clock synchronization method of a communication network and a communication network using the same, and more particularly, to a clock synchronization method of a communication network capable of transmitting a reference clock through a first path including at least a portion reverse to a second path through which a downlink signal is transmitted, and a communication network using the same.

BACKGROUND ART

A distributed antenna system (DAS), which is currently commercially available, receives external reference clock information from a headend device and transmits reference clocks to other nodes (e.g., an extension device or a remote device, etc.).

However, headend devices are generally arranged in a separate space inside a building where most of distributed antenna systems are installed for reasons such as large size and weight, and requiring separate power supply. In such a structure, in order to receive external reference clock information, there is a structural inefficiency in that a clock source and a headend device that are far apart from each other need to be connected to each other with a cable.

DESCRIPTION OF EMBODIMENTS

Technical Problem

The present invention provides a clock synchronization method of a communication network capable of transmitting a reference clock through a first path including at least a portion reverse to a second path through which a downlink signal is transmitted, and a communication network using the same.

Solution to Problem

According to an aspect of an embodiment, a clock synchronization method performed between communication nodes included in a communication network may comprise receiving a synchronization source signal through any one of remaining communication nodes except for an uppermost communication node included in the communication network, generating a reference clock for clock synchronization from the received synchronization source signal and transmitting the generated reference clock through a first path including at least a portion reverse to a second path through which a downlink signal is transmitted in the communication network.

According to an aspect of an embodiment, the uppermost communication node first may receive the downlink signal from among the communication nodes included in the communication network.

According to an aspect of an embodiment, the communication network may comprise at least one of a headend device, an extension device, and a remote device, and the remote device may receive the synchronization source signal.

According to an aspect of an embodiment, the communication network may comprise at least one of a headend device, an extension device, and a remote device, and the extension device may receive the synchronization source signal.

According to an aspect of an embodiment, the transmitting of the reference clock may comprise transmitting the reference clock from a communication node adjacent to the one communication node to a communication node distant from the one communication node.

According to an aspect of an embodiment, in the transmitting of the reference clock, a communication node relatively adjacent to the one communication node may be determined as a synchronization master, and a communication node relatively far from the one communication node may be determined as a synchronization slave, and the reference clock may be transmitted from the communication node determined as the synchronization master to the communication node determined as the synchronization slave.

According to an aspect of an embodiment, the method may further comprise dynamically determining the synchronization master and the synchronization slave based on a Synchronization Status Message (SSM) protocol.

According to an aspect of an embodiment, the method may further comprise selecting one communication node to use for clock synchronization from among two or more communication nodes each connected to a synchronization source providing a synchronization source signal, and the receiving of the synchronization source signal may comprise receiving the synchronization source signal through the selected one communication node.

According to an aspect of an embodiment, the selecting of the one communication node may comprise selecting the one communication node from among the two or more communication nodes except for a failed communication node.

According to an aspect of an embodiment, the selecting of the one communication node may comprise selecting the one communication node according to a state of each of the two or more communication nodes and the ability of a synchronization source to provide a synchronization source signal to each of the two or more communication nodes.

According to an aspect of an embodiment, the synchronization source signal may be a Global Positioning System (GPS) signal.

According to an aspect of an embodiment, at least a portion of the communication network may be installed in a building.

According to an aspect of an embodiment, the one communication node receiving the synchronization source signal may be a communication node installed at the highest altitude from among the plurality of communication nodes included in the communication network.

According to an aspect of an embodiment, a communication network may comprise a first communication node configured to receive a synchronization source signal and generate a reference clock for clock synchronization from the received synchronization source signal, wherein the first communication node is any one of remaining communication nodes except for an uppermost communication node included in the communication network and a second communication node configured to receive the generated reference clock through a first path including at least a portion reverse to a second path through which a downlink signal is transmitted in the communication network.

According to an aspect of an embodiment, the second communication node may be an upper node of the first communication node based on a transmission direction of the downlink signal.

Advantageous Effects of Disclosure

A method and a device according to an embodiment of the present invention may connect a synchronization source providing a synchronization signal in various forms to various locations within a communication network by transmitting a reference clock via a first path including at least a portion reverse to a second path through which a downlink signal is transmitted. Therefore, there is an effect that the communication network may be designed in a form suitable for the installation space.

BRIEF DESCRIPTION OF DRAWINGS

A brief description of each drawing is provided to fully understand drawings recited in the detailed description of the present invention.

MODE OF DISCLOSURE

Figure 1:
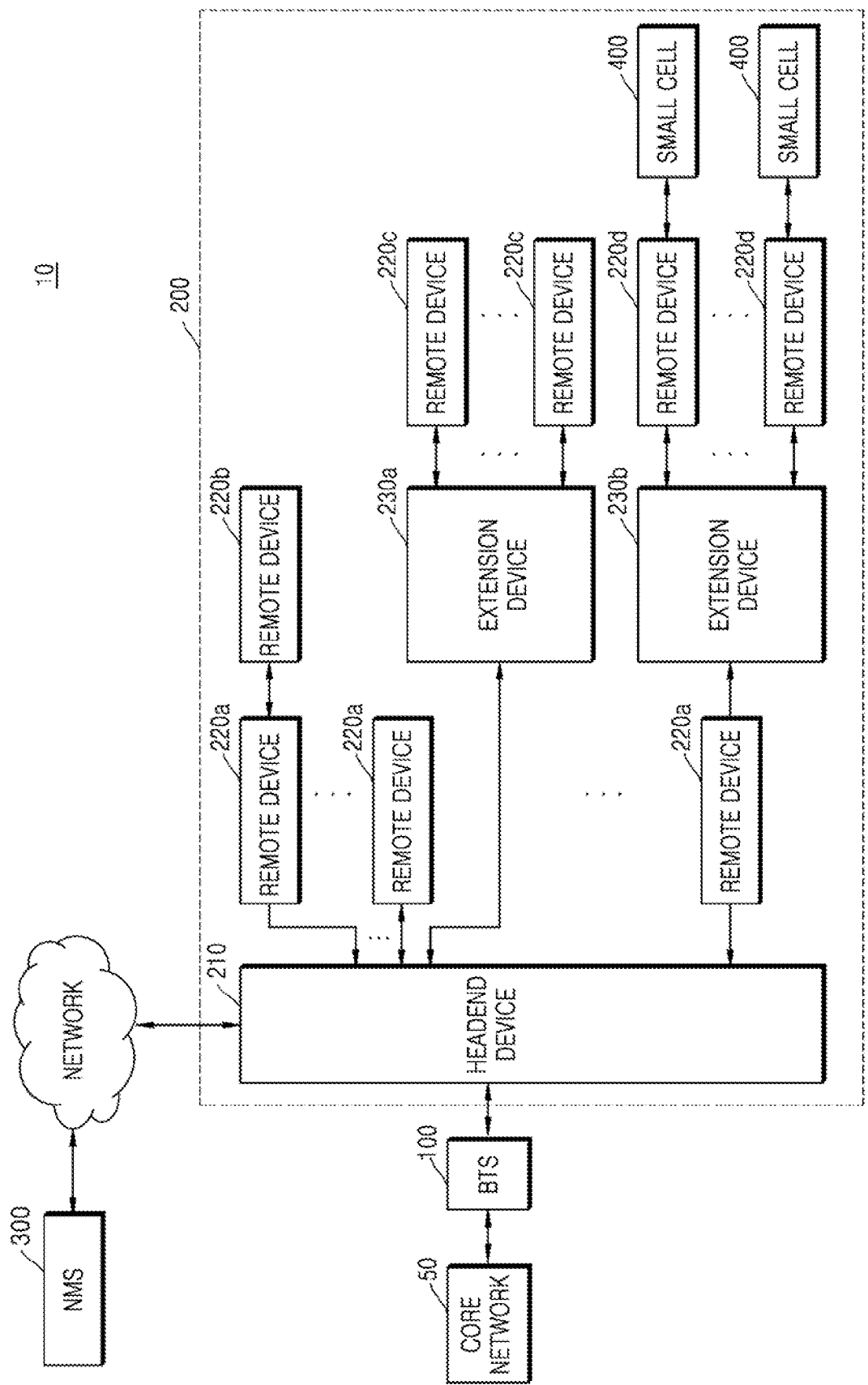
FIG. 1 is a conceptual diagram of a communication system according to an embodiment of the present invention.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

FIG. 1 is a conceptual diagram of a communication system according to an embodiment of the present invention.

Referring to FIG. 1, a communication system 10 may include a core network 50, a base transceiver station (BTS) 100, a distributed antenna system (DAS) 200 for relaying communication signals of the BTS 100, and a network management server (or system) (NMS) 300 for managing and monitoring the DAS 200.

According to an embodiment, the communication system 10 may be divided into a core network 50, the BTS 100 constituting an access network for connecting a user terminal to the core network 50, and the DAS 200.

The DAS 200 is described as an example of a communication network, and may directly perform at least some functions of the BTS 100.

The DAS 200 may include a headend device 210 that is communicatively connected to the BTS 100 and constitutes a headend node, a plurality of remote devices 220a, 220b, 220c, and 220d that constitute a remote node and are connected to other remote nodes or arranged at each remote service location and communicatively connected to a user terminal, and extension devices 230a and 230b constituting an extension node.

According to an embodiment, the DAS 200 may be implemented as an analog DAS.

According to another embodiment, the DAS 200 may be implemented as a digital DAS, and in some cases may be implemented in a hybrid type, for example, in the form of analog processing for some nodes and digital processing for other nodes.

Meanwhile, FIG. 1 shows an example of a topology of the DAS 200 and various variations are possible in the DAS 200 considering specificity of installation areas and application fields (e.g., in-building, a subway, a hospital, a stadium, etc.).

According to an embodiment, a structure of the DAS 200 may be implemented in a form including a redundant structure described later in FIG. 2.

The extension devices 230a and 230b in the DAS 200 may be utilized when the number of branches of the headend device 210 is limited compared to the number of remote devices to be installed.

Each node in the DAS 200 and its function will be described in more detail. First, the headend device 210 may serve as an interface with a base station.

According to an embodiment, the headend device 210 may be connected to a plurality of base stations.

According to an embodiment, the headend device 210 may be implemented with a main headend device and a sub headend device, and may be connected to a base station for each service frequency band of a specific service provider or a base station for each sector. In some cases, the main headend device may compensate for coverage by the sub headend device.

In general, because a radio frequency (RF) signal received from a base station is a high-power signal, the headend device 210 may attenuate such a high-power RF signal into a signal of power suitable for processing at each node. The headend device 210 may lower a high-power RF signal for each frequency band or for each sector to a low-power RF signal. The headend device 210 may be coupled with the low-power RF signal and may distribute the coupled signal to the extension device 230a or the remote device 220a.

According to an embodiment, the headend device 210 may directly receive a communication signal (e.g., Common Public Radio Interface (CPRI), Open Radio Interface (ORI), Open Baseband Remote Radiohead Interface (OBSAI), e-CPRI, etc.) in a digital format from the BTS 100.

Each of the remote devices 220a, 220b, 220c, and 220d may separate received coupled signals for each frequency band and perform signal processing such as amplification. Accordingly, each of the remote devices 220a, 220b, 220c, and 220d may transmit a base station signal to a user terminal within service coverage of the remote devices through a service antenna (not shown).

The remote device 220a and the remote device 220b may be connected to each other through an RF cable or wireless communication, and a plurality of remote devices may be connected to each other in a cascade structure if necessary.

The extension device 230a may transmit the received coupled signal to the remote device 220c connected to the extension device 230a.

The extension device 230b may be connected to one end of the remote device 220a and may receive a signal received from the headend device 210 through the remote device 220a in downlink communication. The extension device 230b may transmit the received signal back to the remote device 220d connected to a rear end of the extension device 230b.

The BTS 100 and the headend device 210 may be connected to each other through an RF cable, an optical cable, or an Ethernet cable (e.g., a twisted cable or a UTP cable), and may be connected to each other through an optical cable or an Ethernet cable (e.g., a twisted cable or a UTP cable), except between the remote device 220a and the remote device 220b, at a lower end of the headend device 210, and a signal transport medium between nodes or a communication method thereof may vary.

According to an embodiment, when internal components of the DAS 200 are connected to each other by an optical cable, the headend device 210, the remote devices 220a, 220b, 220c, and 220d, and the extension devices 230a and 230b may include an optical transceiver module for transmitting and receiving optical signals through electro-optical conversion/photoelectric conversion, and may further include a wavelength division multiplexing (WDM) device when nodes are connected to each other by a single optical cable.

The DAS 200 may be connected to an external management device (not shown) such as the NMS 300 or a network operation center (NOC) (not shown) via a network. Accordingly, an administrator may remotely monitor the state and problem of each node of the DAS 200, and may remotely control the operation of each node.

Figure 2:
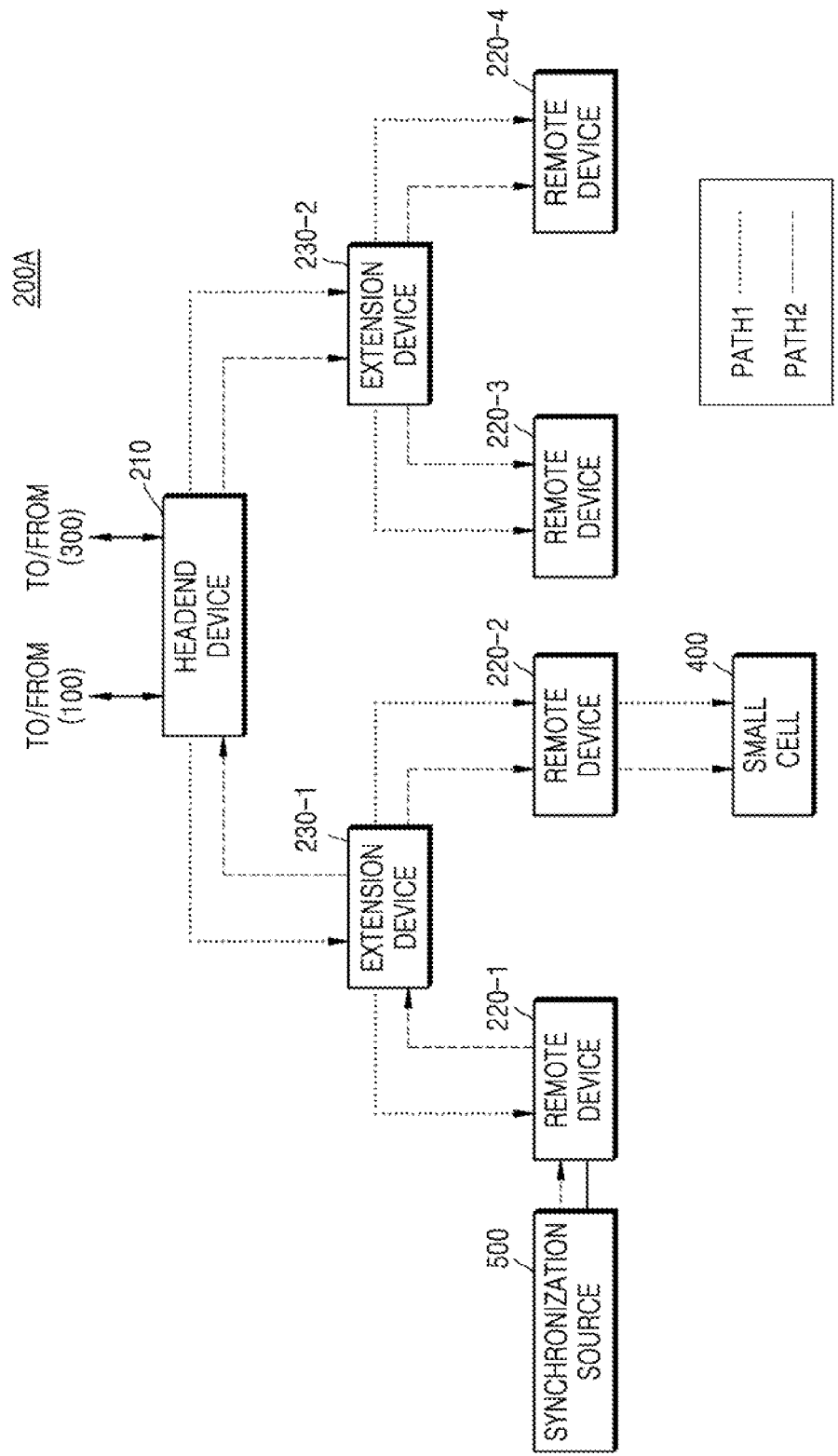
FIG. 2 is a block diagram of a distributed antenna system shown in FIG. 1 according to an embodiment.

FIG. 2 is a block diagram of the distributed antenna system shown in FIG. 1 according to an embodiment.

Referring to FIGS. 1 and 2, a DAS 200A may include a headend device 210, remote devices 220-1 to 220-4, extension devices 230-1 and 230-2, a small cell 400, and a synchronization source 500.

A communication network, for example, the DAS 200A may receive a synchronization source signal through any one communication node (e.g., 220-1) from among the remaining communication nodes (e.g., 220-1 to 220-4 and 230-1 to 230-2) except for the uppermost communication node (e.g., 210) from among the plurality of communication nodes 210, 220-1 to 220-4, and 230-1 to 230-2 included in the distributed antenna system 200A.

According to an embodiment, the uppermost communication node (e.g., 210) may refer to a communication node that first receives a downlink signal from the BTS 100 from among communication nodes 210, 220-1 to 220-4, 230-1 to 230-2, and 400 included in the communication network, for example, the distributed antenna system 200A.

According to an embodiment, the communication node receiving the synchronization source signal may be the remote devices 220-1 to 220-4 or the extension device 230-1 or 230-2.

When the first remote device 220-1 receives the synchronization source signal, the first remote device 220-1 may be connected to the synchronization source 500.

The synchronization source 500 may receive or generate a synchronization source signal. According to an embodiment, the synchronization source 500 may include a Global Positioning System (GPS) antenna. In this case, the synchronization source 500 may receive a GPS signal from the outside of the DAS 200A and use the received GPS signal as a synchronization source signal.

A first remote device 200-1 may extract or generate a reference clock for clock synchronization from the synchronization source signal received from the synchronization source 500.

The first remote device 200-1 may transmit the extracted or generated reference clock from the distributed antenna system 200A to other communication nodes (e.g., 210, 220-2 to 220-4, and 230-1 to 230-2) through a second path PATH2 including at least a portion reverse to a first path PATH1 through which a downlink signal is transmitted.

The first path PATH1 is a path through which a downlink signal is transmitted in the distributed antenna system 200A, and a downlink signal transmitted from the BTS 100 may be transmitted to each of the expansion devices 230-1 and 230-2 through the headend device 210, wherein the expansion devices 230-1 and 230-2 may transmit downlink signals to the remote devices 220-1 to 220-4 connected to the expansion devices 230-1 and 230-2, respectively. Among the remote devices 220-1 to 220-4, a remote device (e.g., 220-2) connected to the small cell 400 may transmit the received downlink signal to the small cell 400 through the first path PATH1.

The second path PATH2 is a path through which a reference clock is transmitted in the distributed antenna system 200A, and the reference clock extracted or generated by the first remote device 200-1 may be transmitted along the second path PATH2.

The second path PATH2 may include at least a portion reverse to the first path PATH1. For example, in the second path PATH2, a path from the first remote device 220-1 to the first expansion device 230-1, and a path from the first expansion device 230-1 to the headend device 210 may reverse the first path PATH1.

The second path PATH2 may be formed in a direction of a communication node distant from a communication node adjacent to a remote device (e.g., 220-1) receiving a synchronization source signal to a communication node distant from the remote device (e.g., 220-1). A reference clock may be transmitted from a remote device (e.g., 220-1) receiving a synchronization source signal in a direction from a communication node adjacent on the second path PATH2 to a communication node distant on the second path PATH2.

For example, a reference clock may be transmitted from the first extension device 230-1 adjacent on the second path PATH2 from the first remote device 200-1 to the headend device 210 far from the first remote device 220-1 on the second path PATH2, and the reference clock may be transmitted from the first extension device 230-1 adjacent on the second path PATH2 from the first remote device 200-1 to the second remote node 220-2 far from the first remote device 220-1 on the second path PATH2, respectively.

According to an embodiment, a relatively adjacent communication node (e.g., 230-1) on the second path PATH2 may be determined as a synchronization master, and a relatively distant communication node (e.g., 210 or 220-2) on the second path PATH2 may be determined as a synchronization slave. In this case, a reference clock may be transmitted from the communication node (e.g., 230-1) determined as the synchronization master to the communication node (e.g., 210 or 220-2) determined as the synchronization slave.

According to an embodiment, when determining the synchronization master and the synchronization slave, it can be determined dynamically based on a Synchronization Status Message (SSM) protocol.

Figure 3:
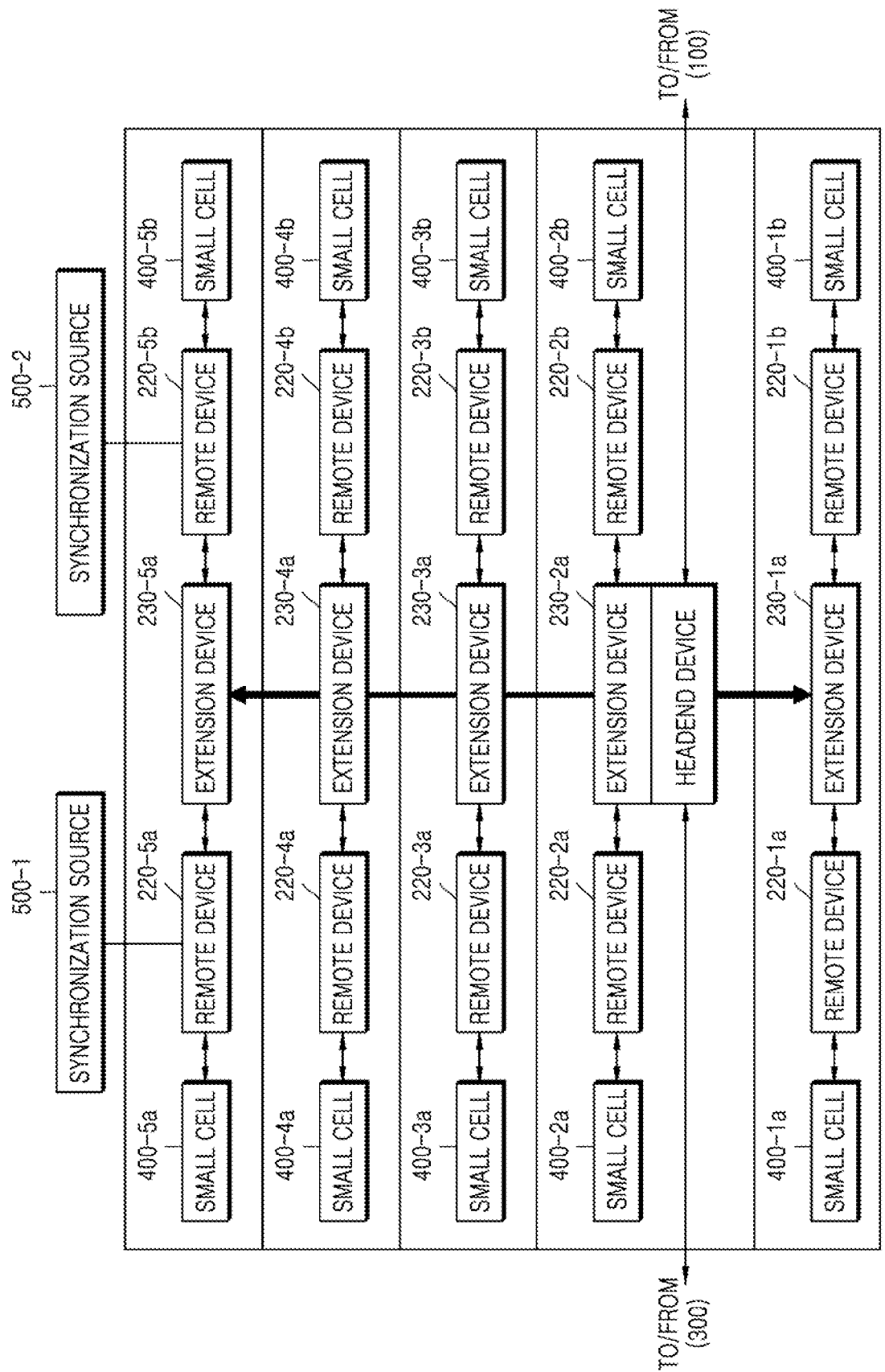
FIG. 3 is a block diagram according to another embodiment of the distributed antenna system shown in FIG. 1.

FIG. 3 is a block diagram according to another embodiment of the distributed antenna system shown in FIG. 1.

Referring to FIGS. 1 and 3, a DAS 200B may include the headend device 210, remote devices 220-1a to 220-5a and 220-1b to 220-5b, extension devices 230-1a to 230-5a, small cells 400-1a to 400-5a and 400-1b to 400-5b, and synchronization sources 500-1 and 500-2.

The distributed antenna system 200B may include two or more communication nodes (e.g., 220-5a and 220-5b) connected to the synchronization sources 500-1 and 500-2 each providing a synchronization source signal.

According to an embodiment, the headend device 210 or the NMS 300 may select one communication node to be used for clock synchronization from among the communication nodes (e.g., 220-5a and 220-5b) connected to the plurality of synchronization sources 500-1 and 500-2.

According to an embodiment, when selecting one communication node to be used for clock synchronization, one communication node to be used for clock synchronization may be selected from among the communication nodes (e.g., 220-5a and 220-5b) connected to the plurality of synchronization sources 500-1 and 500-2, except for a failed communication node. In this case, the headend device 210 or the NMS 300 may monitor whether a failure has occurred in communication nodes (e.g., 220-1a to 220-5a, 220-1b to 220-5b, and 230-1a to 230-5a).

According to an embodiment, when selecting one communication node to be used for clock synchronization, one communication node to be used for clock synchronization may be selected according to the state (e.g., whether there is a failure, traffic, etc.) of each of the communication nodes (e.g., 220-5a and 220-5b) connected to the plurality of synchronization sources 500-1 and 500-2 and the performance (the grade of a synchronization source, the stability and accuracy of a synchronization source signal, and the like) of each of the plurality of synchronization sources 500-1 and 500-2.

According to an embodiment, at least a portion of the distributed antenna system 200B may be installed in a building. In this case, each component of the distributed antenna system 200B may be arranged for each floor of a building, and communication between different layers may be performed through the expansion devices 230-1a to 230-5a and the headend device 210.

According to an embodiment, communication nodes (e.g., 220-5a and 220-5b) receiving a synchronization source signal may be a communication node installed at the highest altitude (or floor) from among a plurality of communication nodes included in the distributed antenna system 200B. In this case, the communication nodes (e.g., 220-5a and 220-5b) receiving a synchronization source signal may be arranged adjacent to the roof of a building, which is advantageous for receiving a synchronization source signal, to obtain a synchronization source signal at a short distance.

Figure 4:
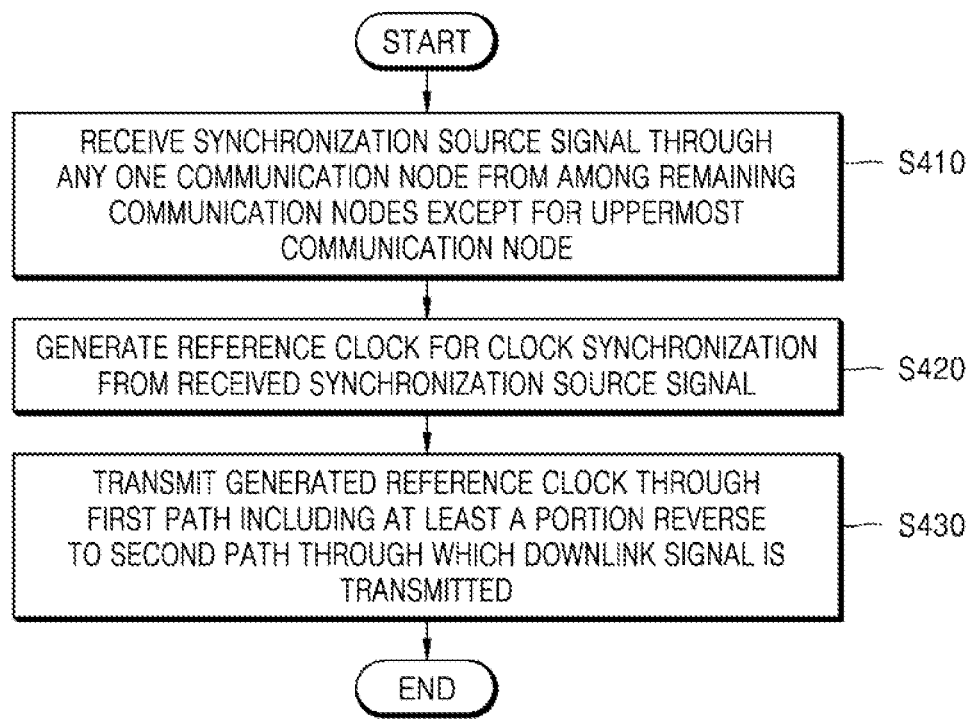
FIG. 4 is a flowchart of a clock synchronization method of a communication network according to an embodiment of the present invention.

FIG. 4 is a flowchart of a clock synchronization method of a communication network according to an embodiment of the present invention.

Referring to FIGS. 1 to 4, in operation S410, a synchronization source signal may be received through any one communication node (e.g., 220-1, 220-5a, or 220-5b) from among the remaining communication nodes except for the uppermost communication node (e.g., 210) from among communication nodes included in a communication network (e.g., 200, 200A, or 200B).

According to an embodiment, the synchronization source signal may be a GPS signal.

In operation S420, the communication node (e.g., 220-1, 220-5a, or 220-5b) that has received the synchronization source signal may generate a reference clock for clock synchronization from the received synchronization source signal.

In operation S430, the communication node (e.g., 220-1, 220-5a, or 220-5b) that has received the synchronization source signal may transmit the reference clock generated in operation S420 through a second path (e.g., PATH2) including at least a portion reverse to a first path (e.g., PATH1) through which a downlink signal is transmitted to another adjacent communication node (e.g., 230-1 or 230-5a).

Hereinabove, the present invention has been described with reference to the preferred embodiments. However, it will be appreciated by one of ordinary skill in the art that various modifications and changes of the present invention can be made without departing from the scope of the inventive concept which are defined in the appended claims and their equivalents.

The invention claimed is:

1. A clock synchronization method performed by a first communication node included in a communication network, the clock synchronization method comprising:

receiving a synchronization source signal from a synchronization source except for an uppermost communication node included in the communication network;

generating a reference clock for clock synchronization based on the received synchronization source signal; and transmitting, to at least one second communication node, the generated reference clock through a first path including at least a portion reverse to a second path through which a downlink signal is transmitted from a base station to the first communication node in the communication network.

2. The clock synchronization method of claim 1, wherein an uppermost communication node receives, from the base station, the downlink signal at first from among communication nodes included in the communication network.

3. The clock synchronization method of claim 1, wherein the communication network comprises at least one of a headend device, an extension device, and a remote device, wherein the first communication node and the at least one second communication node are the remote device.

4. The clock synchronization method of claim 1, wherein the communication network comprises at least one of a headend device, an extension device, and a remote device, wherein the first communication node is the synchronization source signal.

5. The clock synchronization method of claim 1, wherein reference clock
is transmitted from at least one third communication node adjacent to the first communication node to at least one fourth communication node distant from the first communication node.

6. The clock synchronization method of claim 5, wherein, in the transmitting of the reference clock, one of the at least one third communication node is determined as a synchronization master, and one of the at least one fourth a communication node is determined as a synchronization slave, and
the reference clock is transmitted from the communication node determined as the synchronization master to the communication node determined as the synchronization slave.

7. The clock synchronization method of claim 6,
wherein the reference clock is dynamically determined based on a Synchronization Status Message (SSM) protocol in case that the synchronization master and the synchronization slave is determined.

8. The clock synchronization method of claim 1, further comprising:
selecting one communication node to use for clock synchronization from among two or more communication nodes each connected to a synchronization source providing a synchronization source signal,
wherein the receiving of the synchronization source signal comprises:
receiving the synchronization source signal through the selected one communication node.

9. The clock synchronization method of claim 8, wherein the selecting of the one communication node comprises:
selecting the one communication node from among the two or more communication nodes except for a failed communication node.

10. The clock synchronization method of claim 8, wherein the selecting of the one communication node comprises:
selecting the one communication node according to a state of each of the two or more communication nodes and the ability of a synchronization source to provide a synchronization source signal to each of the two or more communication nodes.

11. The clock synchronization method of claim 1, wherein the synchronization source signal is a Global Positioning System (GPS) signal.

12. The clock synchronization method of claim 1, wherein at least a portion of the communication network is installed in a building.

13. The clock synchronization method of claim 12, wherein the first communication node is a communication node installed at the highest altitude from among a plurality of communication nodes included in the communication network.

14. A first communication node in a communication network comprising at least one processor that is configured to:
receive a synchronization source signal from a synchronization source, generate a reference clock for clock synchronization based on the received synchronization source signal, wherein the first communication node is a communication node except for an uppermost communication node included in the communication network; and
transmit, to at least one second communication node, the generated reference clock through a first path including at least a portion reverse to a second path through which a downlink signal is transmitted to the first communication node in the communication network.

15. The first communication node of claim 14, wherein the at least one second communication node is an upper node of the first communication node based on a transmission direction of the downlink signal.

\* \* \* \* \*